(12) United States Patent
Wegner et al.

(10) Patent No.: US 6,413,642 B1
(45) Date of Patent: *Jul. 2, 2002

(54) METHOD FOR COATING SUBSTRATES, PREFERABLY OF METAL

(75) Inventors: Egon Wegner, Münster; Ulrike Clausen-Meiring, Ahlen; Karl-Heinz Grobe Brinkhaus, Nottuln; Lothar Jandel, Münster; Wolfgang Bremser, Münster; Guido Wilke, Münster; Dorothe Drescher, Nordwalde; Rainer Bürstinghaus, Telgte; Günther Ott, Münster, all of (DE)

(73) Assignee: BASF Coatings AG, Muenster-Hiltrup (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,378

(22) PCT Filed: Dec. 2, 1997

(86) PCT No.: PCT/EP97/06736

§ 371 (c)(1),
(2), (4) Date: Aug. 6, 1999

(87) PCT Pub. No.: WO98/24857

PCT Pub. Date: Jun. 11, 1998

(30) Foreign Application Priority Data

Dec. 4, 1996 (DE) .......................... 196 50 157

(51) Int. Cl.$^7$ .............................................. B32B 27/38
(52) U.S. Cl. ..................... 428/418; 428/413; 428/414; 427/407.1; 427/409; 427/412.1; 523/414
(58) Field of Search .............................. 427/407.1, 409, 427/412.1; 428/414, 413, 418; 523/414; 204/181

(56) References Cited

U.S. PATENT DOCUMENTS

| 3,169,945 A | | 2/1965 | Hostettler et al. ......... 260/78.3 |
| 3,707,526 A | | 12/1972 | Gannon et al. ................ 260/47 |
| 3,839,252 A | | 10/1974 | Bosso et al. .......... 260/29.2 EP |
| 3,864,230 A | * | 2/1975 | Springer et al. ............ 204/181 |
| 4,507,412 A | | 3/1985 | Hickner et al. ............. 523/454 |
| 4,575,523 A | * | 3/1986 | Anderson et al. ........... 523/414 |
| 4,692,382 A | | 9/1987 | Schmitt et al. ............. 428/414 |
| 4,692,383 A | | 9/1987 | Schmitt et al. ............. 428/414 |
| 4,830,722 A | * | 5/1989 | Dobblestein et al. .... 204/181.7 |
| 5,100,732 A | * | 3/1992 | Benefiel ..................... 428/457 |
| 5,283,084 A | * | 2/1994 | Lau .......................... 427/407.1 |
| 5,288,802 A | * | 2/1994 | Walters et al. .............. 525/110 |

FOREIGN PATENT DOCUMENTS

EP  WO95/26373  5/1995  ......... C08F/220/04

OTHER PUBLICATIONS

Database WPIL on Questel, Week 8729, London: Derwent Publications Ltd., AN87–202058, class C09D & JP 62129363 (Kansai Paint KK), abstract.

* cited by examiner

*Primary Examiner*—Blaine Copenheaver
*Assistant Examiner*—Christopher Paulraj

(57) ABSTRACT

The present invention relates to a method of coating substrates, preferably of metal, by cleaning the substrate surface, applying, if desired, an organic and/or inorganic pretreatment composition, applying a primer, applying a coating material by spraying, dipping, knifecoating, rollercoating or brushing, the coating material comprising an amine-modified epoxy resin and a crosslinking agent suitable for crosslinking.

20 Claims, 1 Drawing Sheet

METHOD FOR COATING SUBSTRATES, PREFERABLY OF METAL

BACKGROUND OF THE INVENTION

Figure 1:
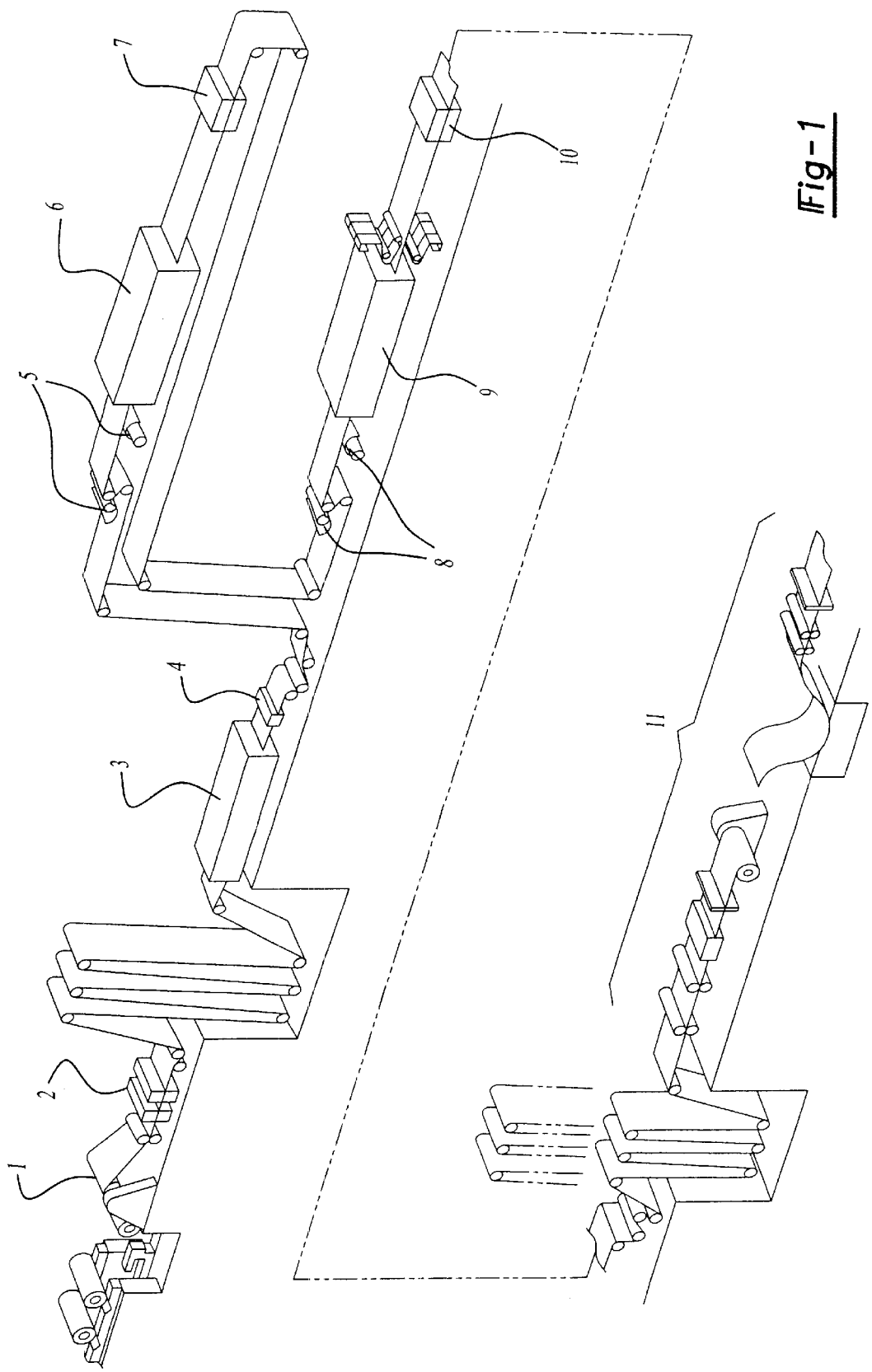

The present invention relates to a method of coating substrates, preferably of metal.

Many of the nowadays customary methods of producing surface-treated strip and metal sheet had already been developed by the beginning of this century. The key breakthrough then came in the 1930s in Europe, with the electrogalvanizing (tinplate) and hot-dip galvanizing of wide strips. Since 1959, when the first hot-dip galvanizing plant was put into operation, there has been an increasing supply of surface-treated thin metal sheet in Germany, beginning with the standard products and numerous other variants in the 1970s and 80s.

In recent years, the metal sheet processing industry has made increasing use of such flat products with metallic coverings and/or organic coatings. Advances in plant technology, in the materials field and in the processing method have advanced the changeover from piece treatment to the pretreated metal sheet or a combination of the two. The evermore complex requirements made of the materials have led to a need to combine the advantages of the substrate material, steel—for example, strength, shapability and weldability—with the specific new properties, such as corrosion resistance and decorative appearance.

The fields of use of the metal sheets coated by means of these methods (so-called coil coating) are very diverse. For the architectural sector there are numerous applications. Coated metal sheets are also used in the interior construction sector for walls, furniture, lamps and domestic electrical appliances. There is also an increasing range of applications in automotive construction. Truck bodies and "bolt-on" automotive parts are often manufactured from precoated materials. Caravans and motor home bodies are produced almost without exception from coated metal sheets.

On the basis of the areas of application indicated, diverse requirements are made of the coatings of the metal sheets. In particular, great flexibility and shapability must be combined with outstanding adhesion by the coating. This is required in particular when the coated material has to be arched at small radii, as when producing car bodies, for example.

At the same time it is necessary to offer a material for further processing which meets the most stringent requirements: thickness, shade, surface quality, and behavior under load. These properties must also be retained when bending and cutting the materials.

Coating materials which can be used for coil coating are known, for example, from the U.S. Pat. Nos. 4,692,382 and 4,692,383. These patents relate to mixtures based on isocyanates and phosphated polyepoxides. In terms of the abovementioned requirements, the properties of these coatings are still not fully satisfactory. This applies in particular to the subfilm corrosion at the scribe mark and at edges. There are also continual adhesion problems.

SUMMARY OF THE INVENTION

It is an object of the present invention to provide a method—devoid of the abovementioned disadvantages—of coating substrates, preferably of metal, by cleaning the substrate surface, applying, if desired, an organic or inorganic pretreatment composition, applying a primer coat, applying, if desired, a topcoat by spraying, dipping, knife coating, roller coating or brushing, and subsequent baking.

This object is surprisingly achieved by the provision of primers which comprise an amine-modified epoxy resin.

The present invention additionally provides substrates, preferably of metal, which are coated with one or more coats and can be produced by cleaning the metal surface, applying, if desired, an organic or inorganic pretreatment composition, applying a primer coat, applying a topcoat by spraying, dipping, knife coating, roller coating or brushing, then baking the coating system, and, if desired, layering a removable sheet over the coating film.

The advantages achieved by virtue of the invention are to be seen essentially in that the primer of the invention exhibits minimal surface defects, if any, and that no adhesion problems occur. The primer of the invention surprisingly exhibits excellent contamination resistance; i.e., the good surface properties of the baked coat are retained even when substances causing surface defects are present.

It is also advantageous that the substrates coated in accordance with the invention are of high and uniform quality and are notable for outstanding properties in terms of shapability, durability, chemical resistance, corrosion resistance and weathering stability. The coated material is therefore particularly suitable for segments requiring small-radius bending. Accordingly, the coated material lends itself particularly well to the production of car bodies. The same applies to the flexibility and adhesion of the coating. Furthermore, the coated substrate meets every requirement in respect of the thickness of the primer, the color shade, the surface quality, and the behavior under load. A particular advantage is the resistance to subfilm corrosion (creep) at the scribe mark and at edges.

Substrates

DETAILED DESCRIPTION OF THE INVENTION

Because of the diverse uses, a very wide variety of substrate materials are used in coil coating. As the first criterion for selection, the subsequent machining steps must be taken into account. Chamfering, bending and deep-drawing require certain qualities and strengths which are ensured by way of the steel alloy or aluminum alloy in question. A further important selection criterion is the subsequent field of use.

In many cases the substrates are pretreated, especially when they are metallic substrates. Suitable pretreatment compositions are all of the organic and inorganic products known to the person skilled in the art. One example is the application of a phosphate coat to the substrate. Steel products not subject to massive corrosion attacks can be processed by coil coating without further pretreatment. In the case of higher humidity and climatic stress, electrogalvanized or hot-dip galvanized material is employed. Even in these treatment stages, different quality standards are produced depending on the intended application. Apart from steel, aluminum is also an important substrate material.

In the case of the metal coverings, zinc and aluminum and their alloys are predominant. The one or two-character symbols correspond to the European standard: Z stands for zinc (Zn), A for aluminum (Al), F for iron (Fe), N for nickel (Ni), S for silicon (Si), E for electrolytic and OC for organic coated. Alloy coverings have gained in importance owing to the possibilities that there are. In addition to standard galvanization, the high-aluminum variants Galfan and Galvalume play an important part here.

The most important coating methods are:
1. Melt dipping, an immersion of the strip into the molten coating metal (which can be used with metals having a relatively low melting point). In this method the strip runs from the annealing furnace under inert gas directly into the hot melt which depending on the metal is at between about 420 and 660° C. Directly thereafter excess metal is blown off on the ascending strip in order to establish the desired add-on both sides, the surface formation is controlled, and the coated strip is cooled. Small additions of aluminum, of around 0.2%, restrict the formation of an alloy layer at the boundary between steel and zinc coating. The additions of silicon in the case of the high-aluminum coatings of hot-dip aluminized metal sheet have a similar effect. Furthermore, the formerly customary small amount of lead (around 0.1%) has been very greatly reduced owing to the formation of the known large zinc bloom in the case of hot-dip galvanized metal sheet, or, indeed, a lead-free procedure is adopted.

Thermal aftertreatment of the freshly galvanized strip at about 520° C. leads, if desired, to a "galvannealed" embodiment, in which the pure zinc coating is converted totally into a zinc/iron alloy (corresponding to the delta phase=$FeZn_7$) with a matt gray appearance. Occasionally, one of the two sides of the strip is freed from the pure zinc coating by brushing; the product, a variant hot-dip galvanized practically on one side, has become known under the name "Monogal".

The composition of the Galfan coating is very close to the eutectic in the zinc-aluminum system. The composition metal is around 0.05%, cerium/lanthanum.

2. The electrolytic deposition of coatings from aqueous solutions, usually sulfate-based, takes place in accordance with Faraday's law. Here, the strip runs horizontally, vertically or, more rarely, radially past the soluble or insoluble anodes. In this way, different add-ons per side, or a single-side deposition, are made possible. In the case of ZnNi alloy galvanizing, the electrolysis parameters are set so as to obtain the desired composition.

As can be seen, zinc can be applied by two methods. The coating structure and some method-related service properties, however, are different.

A common feature of all treatment methods is that the manufacturing sequence consists of the pretreatment of the strip surface by means, for example, of degreasing and the formation of chemical conversion coats such as phosphatizing and the like (in the case of coil coating), the actual treatment, and the aftertreatment. For instance, (alloy-) galvanized strips can be alternatively oiled, chemically aftertreated, or organically sealed.

Primer

In accordance with the invention, a primer is applied, preferably in a coat thickness of 5–10 μm, to the substrate that has, if desired, been treated in the manner described. Following the first passage through the drier, it is possible to apply the topcoat, which after drying generally has a thickness of about 20 μm. To protect against mechanical damage this surface can in some cases be further laminated in the hot state with a temporary protective sheet. In parallel with the coating of the visible faces, the rear faces too are coated, so that here again an appropriate protective film is applied.

The function of the primer is, following application in a thin coat, first to produce very good composite adhesion to the substrate and second to ensure intercoat adhesion to the subsequent topcoat. The service quality and corrosion protection of the coated materials is ultimately founded on the correct combination of these adhesion properties. Correspondingly, different primers are employed for different fields of use. The conventional primers are based on saturated polyester resins of high molecular mass which, in order to enhance the adhesion and corrosion properties, are combined with active anticorrosion pigments.

Different grades of primer are required for the different applications. For the architectural sector, for example, moderate deformation properties, good to excellent surface hardnesses and, for the exterior sector, excellent corrosion resistance and weathering stability are required. Recently, there have also been attempts to employ precoated metal sheets for the production of car bodies, for which the specified requirements must likewise be met. These requirements are met surprisingly by a primer which comprises an amine-modified epoxy resin.

Both self-crosslinking and externally crosslinking amine-modified epoxy resins are known. It is preferred to employ externally crosslinking amine-modified epoxy resins. Preferably, in accordance with the invention, epoxy-amine adducts are used in combination with blocked polyisocyanates.

By amine-modified epoxy resins are meant cationic products of reaction of (A) modified or nonmodified polyepoxides,
(B) primary and/or secondary amines and/or their salts and/or salts of tertiary amines, and, if desired,
(C) polyols, polycarboxylic acids, polyamines or polysulfides.

By polyepoxides are meant compounds which include two or more epoxide groups in the molecule.

For the preparation of the amine-modified epoxy resins, compounds suitable as component (A) are all compounds which include two or more epoxide groups in the molecule. Preference is given to those compounds which include two epoxide groups in the molecule and have a relatively low molecular weight of not more than 750, preferably from 400 to 500.

Particularly preferred components (A) are compounds which can be prepared by reacting (a) a diepoxide compound or a mixture of diepoxide compounds having an epoxide equivalent weight of less than 2000 with
(b) a compound which under the given reaction conditions reacts monofunctionally with respect to epoxide groups and includes a phenol or thiol group, or a mixture of such compounds, components (a) and (b) being employed in a molar ratio of from 10:1 to 1:1, preferably from 4:1 to 1.5:1, and the reaction of component (a) with component (b) being conducted at from 100 to 190° C. in the presence or absence of a catalyst (cf. DE-A-35 18 770).

Further particularly preferred components (A) are compounds which can be prepared by a polyaddition reaction—conducted at from 100 to 195° C. in the presence or absence of a catalyst and initiated by a monofunctionally reacting initiator that carries alternatively an alcoholic OH group, a phenolic OH group or an SH group—of a diepoxide compound and/or a mixture of diepoxide compounds, alone or together with at least one monoepoxide compound, to form an epoxy resin in which diepoxide compound and initiator are incorporated in a molar ratio of more than 2:1 to 10:1 (cf. DE-A-35 18 732). Polyepoxides which can be employed to prepare the particularly preferred components (A) and also as components (A) themselves are polyphenol polyglycidyl ethers prepared from polyphenols and epihalohydrins. As polyphenols it is possible, for example, with very particular preference to employ bisphenol A and bisphenol F. Also suitable are 4,4'-dihydroxybenzo-phenone, 1,1-bis(4-hydroxyphenyl)ethane, 1,1-bis(4-hydroxyphenyl)isobutane, 2,2-bis(4-hydroxy-tert-butyl-phenyl)propane, bis(2-hydroxynaphthyl)methane, 1,5-dihydroxynaphthalene, and phenolic novolak resins. Other suitable polyepoxides are polyglycidyl ethers of polyhydric alcohols, such as ethylene glycol, diethylene glycol, triethylene glycol, 1,2-propylene glycol, 1,4-propylene glycol, 1,5-pentanediol, 1,2,6-hexanetriol, glycerol and 2,2-bis(4-hydroxycyclohexyl) propane, and also neopentyl glycol, for example.

In one preferred embodiment the modified polyepoxy resin is prepared by heating together bisphenol A, bisphenol A diglycidyl ether and a bisphenol A/ethylene oxide adduct, and forming the modified product by amine catalysis.

It is also possible to employ polyglycidyl esters of polycarboxylic acids such as, for example, oxalic acid, succinic acid, glutaric acid, terephthalic acid, 2,6-naphthalenedicarboxylic acid, and dimerized linoleic acid. Typical examples are glycidyl adipate and glycidyl phthalate.

Also suitable are hydantoin epoxides, epoxidized polybutadiene, and polyepoxide compounds obtained by epoxidizing an olefinically unsaturated aliphatic compound.

By modified polyepoxides are meant polyepoxides in which some of the reactive groups have been reacted with a modifying compound. An example is the modification of an epoxy resin with monophenol or thiol compounds.

Further examples of modifying compounds are:
a) carboxyl-containing compounds, such as saturated or unsaturated monocarboxylic acids (e.g., benzoic acid, linseed oil fatty acid, 2-ethylhexanoic acid, Versatic acid), aliphatic, cycloaliphatic and/or aromatic dicarboxylic acids of various chain lengths (e.g., adipic acid, sebacic acid, isophthalic acid or dimeric fatty acids), hydroxyalkylcarboxylic acids (e.g., lactic acid, dimethylolpropionic acid), and also carboxylcontaining polyesters, or
b) amino-containing compounds such as diethylamine or ethylhexylamine or diamines having secondary amino groups, e.g., N,N'-dialkylalkylenediamines such as dimethylethylenediamine, N,N'-dialkylpolyoxyalkyleneamines such as N,N'-dimethylpolyoxypropylenediamine, cyanoalkylated alkylenediamines such as bis-N,N'-cyanoethylethylenediamine, cyanoalkylated polyoxyalkyleneamines such as bis-N,N'-cyanoethylpolyoxypropylenediamine, polyaminoamides such as Versamides, for example, especially products, containing terminal amino groups, of the reaction of diamines (e.g. hexamethylenediamine), polycarboxylic acids, especially dimeric fatty acids and monocarboxylic acids, especially fatty acids, or the reaction product of one mole of diaminohexane with two moles of monoglycidyl ether or monoglycidyl ester, especially glycidyl esters of α-branched fatty acids such as Versatic acid, or
c) hydroxyl-containing compounds such as neopentyl glycol, bisethoxylated neopentyl glycol, neopentyl glycol hydroxypivalate, dimethylhydantoin-N,N'-diethanol, 1,6-hexanediol, 2,5-hexanediol, 1,4-bis(hydroxymethyl) cyclohexane, 1,1-isopropylidene-bis(p-phenoxy)-2-propanol, trimethylolpropane, pentaerythritol or amino alcohols such as triethanolamine, methyldiethanolamine or hydroxyl-containing alkyl ketimines such as aminomethyl-1,3-propanediol methylisobutyl ketimine or tris(hydroxymethyl)aminomethane cyclohexanone ketimine, and also polyglycol ethers, polyesterpolyols, polyetherpolyols, polycaprolactonepolyols, polycaprolactampolyols of various functionality and molecular weights, or
d) saturated or unsaturated fatty acid methyl esters, which are reacted in the presence of sodium methoxide with hydroxyl groups of the epoxy resins.

As component (B) it is possible to use primary and/or secondary amines and/or their salts and/or salts of tertiary amines, the secondary amines being particularly preferred components (B).

The amine should preferably be a water-soluble compound. Examples of such amines are mono- and dialkylamines, such as methylamine, ethylamine, propylamine, butylamine, dimethylamine, diethylamine, dipropylamine, methylbutylamine and the like. Likewise suitable are alkanolamines, such as methylethanolamine, diethanolamine and the like. Dialkylaminoalkylamines are suitable, furthermore, examples being dimethylaminoethyl amine, diethylaminopropylamine, dimethylaminopropylamine and the like. In the majority of cases low molecular mass amines are used, although it is also possible to employ monoamines of higher molecular mass.

Polyamines having primary and secondary amino groups can be reacted with the epoxide groups in the form of their ketimines. The ketimines are prepared from the polyamines in a conventional manner.

The amines may also include other groups as well, lthough these groups should not disrupt the reaction of the amine with the epoxide group and should also not lead to gelling of the reaction mixture.

The charges required for dilutability in water can be generated by protonation with water-soluble acids (e.g., boric acid, formic acid, lactic acid or acetic acid) or else by reaction of the oxirane groups with salts of an amine.

As the salt of an amine it is possible to use the salt of a tertiary amine.

The amine component of the amine acid salt is an amine, which can be unsubstituted or substituted as in the case of hydroxylamine; these substituents should not disrupt the reaction of the amine acid salt with the polyepoxide, and the reaction mixture should not gel. Preferred amines are tertiary amines, such as dimethylethanolamine, triethylamine, trimethylamine, triiso-propylamine and the like. Examples of other suitable amines are specified in U.S. Pat. No. 3,839,252 in column 5 line 3 to column 7 line 42.

As component (C) use is made of polyols, polycarboxylic acids, polyamines or polysulfides, or mixtures of compounds from these classes of substance.

The polyols which are suitable include diols, triols and higher polymeric polyols, such as polyesterpolyols, polyetherpolyols.

Polyalkylene ether polyols which are suitable for component (C) correspond to the general formula

in which R=hydrogen or a lower alkyl radical, with or without various substituents, n=2 to 6 and m=3 to 50 or is even higher. Examples are poly(oxytetramethylene) glycols, poly(oxyethylene) glycols and poly(oxypropylene) glycols (so-called polypropylene glycols).

If polyetherpolyols obtainable by reacting a cyclic polyol, such as bisphenol A, with ethylene oxide or with a mixture of ethylene oxide with an alkylene oxide containing 3 to 8 carbon atoms are employed as component (C), then particularly preferred cationic, amine-modified epoxy resins are obtained (cf. EP-A-74634).

Polyesterpolyols can likewise be used as the polymeric polyol component. The polyesterpolyols can be prepared by polyesterifying organic polycarboxylic acids or their anhydrides with organic polyols which contain primary hydroxyl groups. The polycarboxylic acids and the polyols are usually aliphatic or aromatic dicarboxlic acids and diols.

The diols used to prepare the polyesters include alkylene glycols such as ethylene glycol, butylene glycol, neopentyl glycol and other glycols, such as cyclohexanedimethanol.

The acid component of the polyester consists primarily of low molecular mass carboxylic acids or their anhydrides having 2 to 18 carbon atoms in the molecule. Examples of suitable acids are phthalic acid, isophthalic acid, terephthalic acid, tetrahydrophthalic acid, hexahydrophthalic acid, adipic acid, azelaic acid, sebacic acid, maleic acid and glutaric acid. Instead of these acids it is also possible to use their anhydrides where they exist.

It is also possible to use polyesterpolyols derived from lactones as component (C). These products are obtained by reacting an ε-caprolactone with a polyol. Such products are described in U.S. Pat. No. 3,169,945.

The polylactonepolyols obtained by this reaction feature the presence of a terminal hydroxyl group and repeating polyester units derived from the lactone. These repeating molecular units may be of the formula

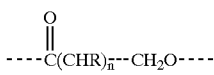

in which n is at least 4, preferably from 4 to 6, and the substituent is hydrogen, an alkyl radical, a cyclo-alkyl radical or an alkoxy radical. An example of these compounds that may be mentioned are polycaprolactonediols of the general formula

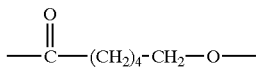

Also employed as component (C) are aliphatic and/or alicyclic polyfunctional alcohols or carboxylic acids having a molecular weight of below 350. Advantageously, they have a branched aliphatic chain, in particular with at least one neo structure.

Suitable compounds are of the following general formula

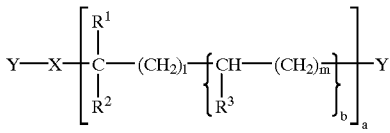

In this formula: a=0; 1 b=0; 1 Y=OH, COOH X=(CH$_2$)n I=0–10 m, n=1–10

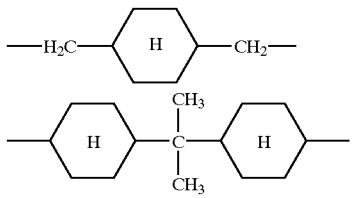

$R^1R^2R^3$=H, alkyl radical of 1 to 5 carbon atoms.

Examples that may be mentioned are: diols, such as ethylene glycol, diglycol, dipropylene glycol, dibutylene glycol, triglycol, 1,2-propanediol, 1,3-propanediol, 2,2-dimethyl-1,3-propanediol, 2,2-diethyl-1,3-propanediol, 2-methyl-2-ethyl-1,3-propanediol, 2-methyl-2-propyl-1,3-propanediol, 2-ethyl-2-butyl-1,3-propanediol, 1,2-butanediol, 1,4-butanediol, 2,3-butanediol, 2-ethyl-1,4-butanediol, 2,2-diethyl-1,3-butanediol, butene-2-diol-1,4, 1,2-pentanediol, 1,5-pentanediol, 3-methyl-1,5-pentanediol, 1,6-hexanediol, 2,5-hexanediol, 2-ethyl-1,3-hexanediol, 2,5-dimethyl-2,5-hexanediol, 1,3-octanediol, 4,5-nonanediol, 2,10-decanediol, 2-hydroxyethyl hydroxyacetate, 2,2-dimethyl-3-hydroxypropyl 2,2-dimethylhydroxypropionate, 2-methyl-2-propyl-3-hydroxypropyl 2-methyl-2-propyl-hydroxypropionate, 4,4'-methylenebiscyclohexanol and 4,4'-isopropylidenebiscyclohexanol. Some preferred diols are 2,2-dimethyl-1,3-propanediol, 3-methyl-1,5-pentanediol, 2,2-dimethyl-3-hydroxypropyl 2,2-dimethylhydroxypropionate and 4,4'-isopropylidenebiscyclohexanol.

Suitable carboxylic acids include a large number of dicarboxylic acids, such as oxalic acid, malonic acid, 2,2-dimethylmalonic acid, succinic acid, glutaric acid, adipic acid, hexahydrophthalic acid, maleic acid, fumaric acid, pimelic acid, suberic acid, azelaic acid, sebacic acid, itaconic acid, citraconic acid and mesaconic acid.

Examples of dicarboxylic acids employed with preference are 2,2-dimethylmalonic acid and hexahydrophthalic acid.

It is also possible to employ long-chain dicarboxylic acids as component (C). Examples of these are dimeric fatty acids, such as dimeric linoleic acid, for instance.

Polyamines suitable as component (C) can be prepared, for example, by reacting primary diamines and monoepoxides; these secondary substituted diamines that are formed modify the epoxy resins in an appropriate manner.

As component (C) it is also possible to use primary-tertiary diamines or alkanolamines such as aminoethanol or aminopropanol.

Suitable polyfunctional SH compounds are reaction products of organic dihalides with sodium polysulfide; further SH compounds are, for example, products of reaction of hydroxyl-containing linear polyesters, polyethers or polyurethanes with mercaptocarboxylic acids such as mercaptoacetic acid, 2-mercaptopropionic acid, 3-mercaptopropionic acid, mercaptobutyric acid and the like.

Primers which are similarly preferred are obtained if the cationic, amine-modified epoxy resins employed are products of reaction of (A) polyepoxides, (B) primary and/or secondary amines and/or their salts and/or salts of tertiary amines, and (C) polyols, especially polyester- and/or polyetherpolyols.

The amine-modified epoxy resins can be employed either as externally crosslinking synthetic resins or as self-crosslinking synthetic resins; self-crosslinking amine-modified epoxy resins can be obtained, for example, by chemical modification of the amine-modified epoxy resins. A self-crosslinking system can be obtained, for example, by reacting the amine-modified epoxy resin with a partially blocked polyisocyanate which possesses on average one free isocyanate group per molecule and whose blocked isocyanate groups become deblocked only at elevated temperatures.

Preferred coating materials are obtained if externally crosslinking amine-modified epoxy resins are employed in combination with a suitable crosslinking agent.

Examples of suitable crosslinking agents are phenolic resins, polyfunctional Mannich bases, melamine resins, benzoguanamine resins, blocked polyisocyanates, and compounds containing at least two groups of the general formula $R^1$—O—CO—.

The radical $R^1$ denotes:
$R^1=R^2$—O—CO—CH$_2$—, $R^3$—CHOH—CH$_2$—, $R^4$—CHOR$^5$—CHOH—CH$_2$—

$R^2$=alkyl $R^3$=H, alkyl, $R^6$—O—CH$_2$— or $R^6$—CO—O—CH$_2$—

$R^4$=H or alkyl $R^5$=H, alkyl or aryl $R^6$=alkyl, cycloalkyl or aryl

Preferred primers are obtained if blocked polyisocyanates and/or compounds which contain at least two groups of the general formula $R^1$—O—CO— are employed as crosslinking agents.

As blocked polyisocyanates it is possible to use any desired polyisocyanates in which the isocyanate groups have been reacted with a compound such that the blocked polyisocyanate formed is stable at room temperature to hydroxyl and amino groups but reacts at elevated temperatures, generally within the range from about 90° C. to about 300° C. In the preparation of the blocked polyisocyanates it is possible to use any desired organic polyisocyanates that are suitable for cross-linking. Preference is given to the isocyanates which contain about 3 to 36, in particular about 8 to about 15 carbon atoms. Examples of suitable diisocyanates are hexamethylene diisocyanate, 2,4-tolylene diisocyanate, 2,6-tolylene diisocyanate, 1-isocyanatomethyl-5-isocyanato-1,3,3-trimethylcyclohexane and also 4,4'-diisocyanatodiphenylmethane (MDI) and its homologs of higher molecular mass, commonly known as fractions of the MDI preparation. It is also possible to use polyisocyanates having a higher isocyanate functionality. Examples of these are trimerized hexamethylene diisocyanate and trimerized isophorone diisocyanate. Furthermore, mixtures of polyisocyanates can also be used. The organic polyisocyanates suitable as crosslinking agents in the context of the invention can also be prepolymers, which are derived, for example, from a polyol including a polyetherpolyol or a polyesterpolyol.

For the blocking of the polyisocyanates it is possible to use any desired suitable aliphatic, cycloaliphatic or aromatic alkyl monoalcohols, examples being aliphatic alcohols, such as methyl, ethyl, chloroethyl, propyl, butyl, amyl, hexyl, heptyl, octyl, nonyl, 3,3,5-trimethylhexyl, decyl and lauryl alcohol; cycloaliphatic alcohols such as cyclopentanol and cyclohexanol; and aromatic alkyl alcohols, such as phenyl carbinol and methylphenyl carbinol.

Other suitable blocking agents are hydroxylamines such as ethanolamine, oximes such as methyl ethyl ketone oxime, acetone oxime and cyclohexanone oxime, or amines such as dibutylamine and diisopropylamine. In suitable proportions, said polyisocyanates and blocking agents can also be used to prepare the abovementioned partially blocked polyisocyanates.

Examples of compounds which contain at least two groups of the general formula $R^1$—O—CO— are bis (carbalkoxymethyl) azelate, bis(carbalkoxymethyl) sebacate, bis(carbalkoxymethyl) adipate, bis (carbalkoxymethyl) decanoate, bis(carbalkoxymethyl) terephthalate, bis(2-hydroxybutyl) azelate and bis(2-hydroxyethyl) terephthalate.

The crosslinking agent is employed generally in an amount of from 10 to 50% by weight, preferably from 25 to 40% by weight, based on the amine-modified epoxy resin. The proportion of the epoxy resin is, accordingly, from 90 to 50% by weight, preferably from 75 to 60% by weight. In order to increase the flexibility and shapability of the coating materials it is possible in addition to add oligomeric polyols which possess little or no volatility under the baking conditions and which in the course of the crosslinking reaction are incorporated as plasticizing segments into the film network. The amount of these oligomeric polyols as a proportion of the resin/crosslinker mixture can be up to 30% by weight, preferably from 2 to 12% by weight. Examples thereof are polyether alcohols and polyester alcohols. One class of polyether alcohols is represented by the polypropylene glycols, polyethylene glycols, and the polypropylene/polyethylene mixed diols, and another by the polyetherols obtained by reacting monophenols with ethylene oxide and/or propylene oxide and by the polyethers prepared from bisphenol A and ethylene oxide and/or propylene oxide. Of these, preference is given to Pluriol P600, Pluriol P900, Pluriol P2000 (from BASF), and also Plastilit 3060 (from BASF) and ethoxylated bisphenol A. Preferred polyester alcohols are polycaprolactones such as Capa 200 (from Interox) or PCP 200 (from Union Carbide).

The resin/crosslinker/plasticizer mixtures can be prepared as organic solutions by dilution with suitable solvents. The primary criterion for dilution is not the solids content of the mixture, which can be between 80 and 50%, but the viscosity, which describes the flow behavior of the mixture. This viscosity is determined in accordance with the efflux method in the DIN4 cup. For the formulations of the invention it should lie within the range between 150 and 50 seconds; the preferred range is 110–70 seconds. Obviously, however, as high a solids content as possible is the aim.

A further, preferred dilution form is constituted by the aqueous solution/dispersion of the compositions of matter described in which water represents the dominant solvent. For this purpose, the basic amino groups from the amine-modified epoxy resin are converted to hydrophilic salt groups by neutralization with an acid before or during dilution with water. In one preferred embodiment only some of the amino groups are neutralized (degree of neutralization less than 100%). The less-than-complete neutralization suppresses the development of a transparent aqueous solution, and instead a colloidal dispersion is formed. For a given solids content, the aqueous dispersion possesses a viscosity lower than that of the fully neutralized aqueous solution. By controlled selection of the degree of neutralization it is possible in this way to obtain a maximum solids content within a given viscosity frame. On the other hand, the degree of neutralization must be sufficiently high to prevent the coating mixture from separating into two phases.

A further criterion is the pH of the aqueous coating mixture. For a given level of base in the amine-modified epoxy resin, a high degree of neutralization brings about a low pH while a low degree of neutralization implies a high pH. At a low pH, although the chemical/hydrolytic stability and the physical settling behavior are less threatened, the required efflux viscosity in the DIN4 cup of 150–50 seconds can be achieved only at low solids contents. At a high pH both the hydrolytic stability of the blocked polyisocyanates and the physical settling stability are more greatly threatened, although under these conditions it would be possible to achieve a maximum solids content. The task is therefore to choose the degree of neutralization such that an optimum balance is achieved between the abovementioned requirements. For a given amine level in the epoxy-amine adduct, characterized by the level of base in the mixture (MEQ base in milliequivalents/gram of solid resin), the degree of neutralization should lie between 70 and 10%, preferably between 40 and 20%. Acids employed are organic acids and also derivatives of phosphoric acid. Examples of these are: formic acid, acetic acid, propionic acid, valeric acid, lactic acid and also hypophosphorous acid.

The primer of the invention is employed either as an organic dilution or as an aqueous dilution. In the case of the aqueous dilution form, particular preference is given to the use of a product of reaction of an epoxy resin, which has been modified with a monophenol compound or thiol compound, and amines, and also, if desired, diols, dicarboxylic acids and similar compounds.

For the organic dilution form it is preferred to use a composition of matter consisting of—as principal resin—an epoxy-amine adduct elasticized with ethoxylated bisphenol A, together with a polyisocyanate crosslinker, e.g. diphenylmethane diisocyanate.

The primers are prepared by methods which are well and widely known. The synthetic resins are synthesized in accordance with well-known methods (cf. e.g. DE-C-27 01 002 and the further patent documents cited on page 1) in organic solvents. The synthetic-resin solutions or dispersions obtained in this way are transferred in neutralized form to an aqueous phase.

Pigments can also be incorporated in the form of a pigment paste into the aqueous dispersion of the resin.

The preparation of pigment pastes is common knowledge and need not be elucidated further here (cf. D. H. Parker, Principles of Surface Coating Technology, Interscience Publishers, New York (1965); R. L. Yates, Electropainting, Robert Draper Ltd., Teddington/England (1966); H. F. Payne, Organic Coating Technology, Volume 2, Wiley and Sons, New York (1961)).

Pigment pastes are prepared using, for example, epoxyamine adducts containing quaternary ammonium groups.

The pigment pastes can in principle comprise any pigment suitable for coating materials. Titanium dioxide is generally the sole or the major white pigment. Other white pigments or extenders, such as antimony oxide, zinc oxide, basic lead carbonate, basic lead sulfate, barium carbonate, porcelain, clay, calcium carbonate, aluminum silicate, silica, magnesium carbonate and magnesium silicate, can also be used, however. Examples of colored pigments which can be used are cadmium yellow, cadmium red, carbon black, phthalocyanine blue, chromium yellow, toluidyl red, and hydrated iron oxide.

In addition to the pigments, the pigment paste may also comprise plasticizers, fillers, wetting agents, etc.

The pigment paste is added to the aqueous dispersion of the synthetic resin in an amount such that the finished primer has the desired properties. In the majority of cases the proportion by weight between pigment and synthetic resin is from 0.05 to 0.5.

In addition to the synthetic resin an d the pigment paste, the primers of the invention may also include other customary additives, such as, for example, co-solvents, antioxidants, surfactants, etc.

The solids content of the primers of the invention is preferably from 7 to 35 parts by weight, with particular preference from 12 to 25 parts by weight. The invention also provides a method of coating substrates, preferably of metal, by cleaning the substrate surface, applying, if desired, an organic or inorganic pretreatment composition, applying a primer, applying a topcoat by spraying, knifecoating, dipping, rollercoating or brushing, and subsequently baking.

Topcoats

Following application to the substrate, the primer of the invention is preferably coated with a topcoat. This application of topcoat can be made following the application of the primer or else, judiciously, only after the mechanical deformation/shaping of the primer-coated substrate has been completed.

In principle, all commercially customary topcoats can be employed. Such coating materials are known to the person skilled in the art for the wide variety of requirement profiles.

The requirements made of a topcoat are determined initially by the intended field of use. In the liquid state the topcoat must first of all withstand the high shear stress in the course of roller application without undergoing any change in the course of prolonged processing. Skillful harmonization of production and test conditions achieves the predetermined shade and gloss exactly. Lamination with protective sheet imposes the additional requirement of a controlled adjustment of the forces of adhesion to this sheet. The normal coat thicknesses of the topcoats are generally about 20 μm.

As the topcoats it is possible to use commercially customary coil coating polyester topcoats or coil coating polyurethane topcoats (e.g. BASF Lacke+Farben AG, data sheets).

Multicoat Structure

The products of the invention preferably comprise a two-coat structure: primer+topcoat. Film formation takes place between 200 and 260° C. in around 30 to 60 seconds; the usual dry-film thicknesses are 25 μm and from 100 to 250 μm respectively.

Over the coating film it is possible to apply a printed and decorative sheet or a removable protective sheet. The sheets involved are primarily PVC and PVF sheets. These sheets are stuck on under hot conditions using an adhesion promoter. The removable protective sheets are stuck on under cold conditions or applied adheringly under hot conditions. The reverse face of the metal sheet generally carries a (protective) coating with a thickness of from 5 to 15 μm which is applied in one or two coats.

Particular features which may be mentioned are textured coatings and combinations of coating and transparent sheet, which are employed primarily in the domestic appliance industry. Three- and four-coat systems are prepared for particularly demanding applications in outdoor use.

For the automotive industry, coil-coated galvanized materials are employed. The system involved in this case is preferably a thin, 1 to 3 μm sealant, zinc-rich paint, weldable or nonweldable primers ("preprimed") and thicker systems of up to 50 μm, suitable for differing requirements in the case of bodywork parts or accessory components.

Composite metal sheet in the three-coat format is produced with a total thickness of from 0.8 to 2.0 mm, in symmetrical or asymmetrical cross section. Metal top sheets employed can be all types of metal sheet, including stainless steel or aluminum, for example. The viscoelastic interlayer with high internal friction has a thickness of from 25 to 50 μm. Depending on the field of work required, there is type 1 having a high loss factor (as a measure of the damping) for use between about −10 and +60° C. (e.g., for up-and-over garage doors and waste glass collecting containers), and type 2 for use between about 50 and 130° C. (especially in the case of automotive accessory components such as oil pans and valve caps).

Fields of Use

The invention additionally provides for the use of the coated substrates for producing construction accessories, furniture, instrument paneling, vehicle bodies, domestic appliances and lamp casings. A particularly preferred area comprises fields in which small-radius bending is required, as is the case, for example, with vehicle bodies.

For many applications it is sufficient to coat the surface with a single coat. The reverse faces of the coated coils, in particular, are coated with only a single coat. In this case, the reverse-face coating materials used are the primers of the invention, since they have excellent adhesion and corrosion protection properties.

On the front face as well it is common to employ single-coat coating materials in the form of the primers of the invention. For instance, for some interior applications in the building sector it is sufficient to work with a single coat with a thickness of from 20 to 22 μm. In the packaging sector as well, coils coated with only one coat are employed.

In the text below, the individual fields of use will be looked at in further detail.

Exterior Architectural

For facings and roofs, but also for construction accessory components, such as doors, gates and window frames, the primer of the invention is applied preferably as a first coat of 5–8 µm. This is followed by the use of a topcoat. After drying, protection against mechanical damage in the course of subsequent processing is ensured using a polyethylene sheet. Following the assembly of the component, this sheet is removed from the object again.

The reverse face can be coated, for example, with the primer of the invention, which in the case of the production of components is completed with a rigid polyurethane foam for the purpose of heat insulation. Accordingly, the adhesion properties of a reverse-face coating material of this kind with respect to polyurethane foam must be optimized.

For standard steel, hot-dip galvanized, electro-galvanized and Galfan substrates it is likewise possible to employ the primers of the invention. Atop the preferably 5–8 µm thick primer coat there is applied, depending on shade, the CD 24 topcoat, at preferably 18–22 µm. Within this gloss range of 20–70 units, this topcoat is notable for good hardness, represented by the pencil hardness F, and a flexibility, measured at the point of flexure, of $\leq$T 3.0. In addition to these basic data which are important for the further mechanical working, the long-term behavior of the finished components is of course critical. Weathering stability is established for a period of 5–10 years. This means that, following this period, gloss and shade have undergone only little change, and instances of corrosion at edges and sites of damage are present only within a narrow range. The specific weathering data are of course dependent on the particular shade considered, since the pigments as well exhibit different weathering behavior.

Architectural, Interiors

For the production of ceiling elements, partitions, shelving, shopfitting, steel furniture and many other items, the primer of the invention is generally applied first of all to the substrate used. The coat, which is preferably 5–8 µm in thickness, is subsequently coated further with a topcoat, to which, if desired, a temporary protective sheet is applied in addition.

For parts which are subjected to particularly high mechanical stress it is also possible to employ a textured coating system. In this case, owing to the peak and valley structure, the susceptibility to mechanical damage is relatively low. The overall coat thickness is about 32–35 µm, with the textured coating material itself requiring 12–15 µm, depending on the extent of the texture. In this case a bending ability of T 0.5–T 2.5 is achieved, depending on the system. Suitable fields of use in the interior sector are partitions, ceiling elements and, in particular, the linings of cold-storage facilities, and also shelving, warehousing and shopfitting systems. However, these textured coating materials are also employed in the exterior sector, for shutters, blinds, doors and gates.

White Goods

By white goods are meant lamps and light fittings and also electrical domestic appliances, such as refrigerators, freezers, washing machines, driers, dishwashers, microwave ovens and fume hoods.

The system for lamps and light fittings consists, in accordance with the invention, of a white primer and a topcoat. This system is notable for good surface hardness combined with normal deformation properties. The degree of reflection, which is important in lighting terms, is particularly optimized in the case of this glossy grade.

The two-coat system was developed in particular for long-array luminaires with highly complex and narrow bending radii. Here, on standard steel and aluminum, an excellent bending ability, at T 0–T 0.5, is achieved. The special nature of this system is that the coating material acts simultaneously as both primer and top-coat. The overall coating system consists of 2×13 µm of the primer of the invention. In addition to its good mechano-technological properties, this primer system has been conceived such that despite the high gloss, at >80 units, it is possible to operate at more than 70 m/min given an appropriate equipment setting.

In the case of the electrical domestic appliances, a distinction is nowadays made in principle between two different systems. If a smooth surface is required, the system is built up in the same way as those described above. To achieve a surface having a structure like that of a conventionally spray-painted surface, a textured primer of the invention is applied first of all. A smooth topcoat is subsequently applied over the primer.

In principle, the requirements for different domestic appliances are matched to the subsequent use. Whereas in the case of refrigerators particular attention is paid to resistance to marking by various foods, and the outer surface must be easy to clean to remove an overflow of polyurethane foam, which is employed as heat insulation, in the course of production of the refrigerator or freezer, the coating of a washing machine surface requires particularly good resistance to detergents. The requirements for dishwashers and driers are similar to those for the washing machine.

Overall, the requirements made of the coated surface are very high in terms of the combination of surface hardness, good deformability and chemical or food resistance, this combination being met to a special extent by the primers employed in accordance with the invention.

Automotive Construction

In automotive construction very different applications come to bear. In the case of such specialities it is necessary overall for the substrates, pretreatment and coating material to be matched to one another in a very balanced manner. In this case it is possible to employ the above-described primers with particular advantage.

Production Process

The substrate, a strip which consists preferably of steel or aluminum, passes through the entire continuous strip treatment line at a defined speed. In doing so it is subjected to a multistage treatment consisting of the following operations: cleaning, pretreatment, applying the organic coatings, baking/drying in the through-type ovens, and coiling the coated product or cutting it into panels.

Taken precisely, the sequence of operation in the case of the typical liquid coating is divided into 11 operations.

The strip speed in accordance with the invention lies preferably within the range from 30 to 120 (m/min).

In the text below the invention is described in more detail with reference to the FIGURE.

In section 1, the metallic substrate material is uncoiled from the unwinder. In stage 2, the beginning of the strip to be treated is mechanically attached (stitched) to the end of the strip being coated. In section 3, the strip is precleaned. In the course of this section there is a stretch alignment treatment in order to ensure a good planar position. Cleaning takes place with acidic or alkaline solutions. This is followed by a chemical pretreatment.

Depending on the subsequent treatment, washing, neutralizing and drying are carried out in stage 4. In stage 5 the primer is applied, the strip being coated on either one or both sides. After this the strip passes through a first oven 6.

Following that, the strip is guided over the cooling section 7. Thereafter, in the unit 8, it is coated on one or both sides with topcoat.

In the apparatus 9 there may be, alternatively, embossing of the coating or passage through a second oven and/or, alternatively, application of a protective sheet.

This is followed by the cooling section 10. Finally, in section 11, quality control is carried out (visual surface inspection, random sampling and tests). Finally there is recoiling and also, if desired, lengthwise separation (splitting) or cutting into panels and packing.

The invention is described in more detail below with reference to the examples in terms of the coating materials employed:

All parts and percentages are by weight unless expressly stated otherwise.

EXAMPLES 1–4

1. Preparation of a Crosslinker (Crosslinker A)

A reactor equipped with a stirrer, reflux condenser, internal thermometer and inert gas inlet is charged with 1133 parts of tolylene diisocyanate (2,4- and 2,6-isomer mixture 80:20) and 356 parts of MIBK under a nitrogen atmosphere. 0.7 part of dibutyltin dilaurate is added, and 290 parts of trimethylolpropane are introduced in small portions at equal intervals over the course of 4 hours such that the internal temperature does not rise above 45° C. 30 minutes later an NCO equivalent weight of 217 is measured (based on solid components). With further cooling, 722 parts of n-propyl glycol are added dropwise over the course of 1 hour. At the end of the addition, the mixture is heated to 100° C. and allowed to react for a further hour. At this point in time it is no longer possible to detect NCO groups. The composition is then cooled and diluted with 500 parts of MIBK to a solids content of 70% (1 h at 130° C.).

2. Preparation of a Crosslinker (Crosslinker B)

A suitable reaction vessel is charged under nitrogen with 2440 parts of triisocyanuratized hexamethylene diisocyanate and this initial charge is diluted with 850 parts of methyl isobutyl ketone (MIBK). The mixture is heated to 50° C. and 1560 parts of di-n-butylamine are run in at a rate such that the temperature can be kept at 60–70° C. with external cooling. After the end of the addition, the temperature is raised to 75° C., held for one hour, and 150 parts of n-butanol are added. The isocyanate equivalent and the amine equivalent are each above 20,000. The solids content of the product is 79.6% (1 h at 130° C.)

3. Preparing an Amine-basic Main Resin

In a laboratory reactor heated with heat transfer oil and equipped with stirrer, reflux condenser, thermometer and inert gas inlet pipe, 1960 parts of a commercial epoxy resin based on bisphenol A and having an equivalent weight of 490 (Epikote 1 001, from Shell) are melted in the presence of 220 parts of nonylphenol and 111 parts of xylene at 125° C. When the melt is clear, traces of adhering moisture are removed under vacuum for 20 minutes using a water separator. Then 3.5 parts of N,N-dimethylbenzylamine are added and the reaction is conducted at 130° C. to an epoxide equivalent weight (EEW) of 1080. The mixture is then cooled, during which it is diluted with 142 parts of butyl glycol and 254 parts of xylene. At 90° C., 147 parts of diethanolamine are added and reaction is carried out for 1 hour. The reaction mixture is subsequently diluted with 107 parts of propylene glycol phenyl ether and 400 parts of isobutanol and cooled further. At 70° C., 46 parts of N,N-dimethylaminopropylamine are added and the mixture is heated to 90° C. and held at this temperature for 2 hours. It is then cooled and discharged. The resin has a solids content of 70% and a viscosity of 3.8 dPas (40% strength in propylene glycol methyl ether; cone and plate viscometer at 23° C.).

4. Examples of the Preparation of the Primers of the Invention

Example 1

Organic Solution of Resin/Crosslinker Mixture (BM 1)

916.7 parts of the above resin (section 3) are mixed with 252 parts of crosslinker A (section 1), 220.5 parts of crosslinker B (section 2), 43.2 parts of Plastilit 3060 (plasticizer from BASF) and 4.2 parts of dibutyltin dilaurate (commercial solution). When the mixture has been homogenized, it is diluted with 639 parts of MIBK (solids content 50% theoretically).

Example 2

Aqueous Resin/Crosslinker Mixture (BM 2)

916.7 parts of the above resin (Example 1), 252 parts of crosslinker A (section 1), 220.5 parts of crosslinker B (section 2), 43.2 parts of Plastilit 3060 (plasticizer from BASF) and 4.2 parts of dibutyltin dilaurate (commercial solution) are mixed at room temperature. 2.1 parts of a defoamer solution (Surfynol 104; Air Products; 50% strength solution in butyl glycol) and 23.8 parts of glacial acetic acid are added and the mixture is diluted with stirring, with 682 parts of demineralized water, to an efflux viscosity of 70 seconds (DIN 4 cup). The solids content of the aqueous mixture is 46.0% (1 h at 130° C.). The solid fraction has an MEQ base of 0.68 and an MEQ acid of 0.17 (in each case in milliequivalents/g).

Example 3

Aqueous Resin/Crosslinker Mixture (BM 3)

The BM 2 described in Example 2 is repeated but with the difference that dibutyltin dilaurate is replaced in equal amounts by a lead octoate solution. The solids content of the mixture is 45.2%. The MEQ base is 0.67 and the MEQ acid is 0.17 milliequivalents/g of solids.

Example 4

Aqueous Resin Solution (BM 4)

A laboratory reactor heated by heat transfer oil and equipped with stirrer, reflux condenser, thermometer and inert gas inlet pipe is charged with 1346 parts of a commercial epoxy resin based on bisphenol A and having an equivalent weight of 188 and with 612 parts of bisphenol A, and this initial charge is heated to 130° C. in the presence of 101 parts of xylene. Then 2.2 parts of triphenylphosphine are added and the initially exothermic reaction is conducted at 130° C. up to an EEW of 1123. The reaction mixture is then diluted with 726 parts of butyl glycol, and a mixture of 152 parts of 88% strength lactic acid, 147 parts of N,N-dimethylethanolamine, 51 parts of propylene glycol phenyl ether and 51 parts of demineralized water is added at 80° C.

After 90 minutes, when the reaction mixture has an acid number of 1.3 mg of KOH/g, it is cooled and diluted at room temperature with demineralized water until the efflux viscosity in the DIN 4 cup is <100 seconds. The resin solution has a solids content of 46.6% (1 h at 130° C.) and a base content of 0.75 milliequivalents/g.

Example 5 a. Modified Epoxy Resin

The following example shows the preparation of an aminized epoxy resin which comprises primary amino groups, and ethoxylated bisphenol A as flexibilizing group. Bisphenol A, bisphenol A diglycidyl ether, and a bisphenol A/ethylene oxide adduct are heated together and by amine catalysis form a modified polyepoxy resin. This is subsequently reacted with a mixture of secondary amines. When the reaction is at an end, the product is diluted to a solids content of 60%.

| Starting materials | Weight fractions |
| --- | --- |
| 1. Epikote 828[1] | 682.4 |
| 2. Bisphenol A | 198.4 |
| 3. Dianol 265[2] | 252.7 |
| 4. Methyl isobutyl ketone | 59.7 |
| 5. Benzyldimethylamine | 1.0 |
| 6. Benzyldimethylamine | 2.7 |
| 7. Diketimine[3] | 65.4 |
| 8. Methylethanolamine | 59.7 |
| 9. Solvesso 150 | 55.2 |
| 10. 1-Phenoxy-2-propanol | 43.0 |
| 11. Butyl glycol | 299.0 |
| 12. Solvesso 150 | 342.0 |

[1]Liquid epoxy resin prepared by reacting bisphenol A and epichlorohydrin, having an epoxide equivalent weight of 188, from Shell Chemicals
[2]Ethoxylated bisphenol A having an OH number of 222, from Akzo
[3]Diketimine from the reaction of diethylenetriamine and methyl isobutyl ketone, 75% strength in methyl isobutyl ketone The Epikote 828, bisphenol A and Dianol 265 are heated to 145° C. in a reactor under nitrogen blanketing. Then 1.0 part of the benzyldimethylamine (catalyst) is added, the reaction mixture heating up to a temperature between 160° C. and 190° C. When an epoxide equivalent weight of 640 has been reached, the reaction mixture is cooled to 145° C. Then the remainder of the benzyldimethylamine is added and the temperature is held at 145° C. until, after about 2.5 h, an epoxide equivalent weight of 1120 is established. Directly thereafter, the temperature is reduced to 100° C. by means of evaporative cooling. The mixture of secondary amines is then added and the reaction is maintained at 1150 for about 1 h until a viscosity of about 6 dPas has been reached (50% strength dilution in methoxypropanol, ICI cone and plate viscometer). Following the addition of the phenoxypropanol and the remaining solvents, a resin with a solids content of 60% and a viscosity of 20 dPas (50% strength in butyl glycol, ICI cone and plate) is obtained.

b. Preparation of the Polyurethane Crosslinker

Polyurethane crosslinker prepared from diphenylmethane diisocyanate for which, of 6 mols of isocyanate, 4.3 are first reacted with butyl diglycol and the remaining 1.7 mol with trimethylolpropane. The crosslinker is in the form of an 80% strength solution in methyl isobutyl ketone and isobutanol (weight ratio 9:1).

| Starting materials | Weight fractions |
| --- | --- |
| 1. Basonat A 270[1] | 810.0 |
| 2. Dibutyltin dilaurate | 0.5 |
| 3. Butyl diglycol | 696.6 |
| 4. Methyl isobutyl ketone | 287.2 |
| 5. Trimethylolpropane | 85.8 |
| 6. Butanol | 39.8 |
| 7. Methyl isobutyl ketone | 71.1 |

[1]Basonat A 270, diphenylmethane diisocyanate, tradename of BASF AG

Items 1 and 2 are charged to the reactor. Item 3 is metered in such that the temperature remains below 60° C. On reaching an NCO equivalent weight of 890, the batch is diluted with MIBK and TMP is added. The reaction is maintained at 100° C. until conversion is complete. The reaction mixture is finally diluted with butanol and MIBK to a solids content of 80%. The viscosity is 6 dPas (60% strength in Solvenon PM, ICI cone and plate).

c. Resin Crosslinker (BM5)

41.6 parts of the modified epoxy resin solution (Ex. 5, a.) and 10.5 parts of the polyurethane crosslinker (Ex. 5, b.) are mixed at room temperature and 0.9 part of a monobutyltin oxide solution (MBTO solution, 35% strength, from Atochem) is added. The mixture is subsequently adjusted with butyl glycol to a processing viscosity of from 80 to 100 seconds in the DIN 4 cup.

5. Performance Tests

The binders described above in accordance with Examples 1 to 5 are applied to hot-dip galvanized steel panels (Bonder 1303 from Chemetall) with the aid of a coating bar (rod no. 10) and are baked under coil coating conditions with an average peak temperature of 216° C.

For comparison, a prior art primer was tested.

Results Table:

| Tests | Unit | BM 1 | BM 2 | BM 3 | BM 4 | BM 5 | CP21-0916 standard[1] |
| --- | --- | --- | --- | --- | --- | --- | --- |
| Coat thickness | μm | 5 | 5 | 5–6 | 3–5 | 4 | 5 |
| MEK test[2] | DS | 13 | 11 | 15 | 2 | 15 | 15 |
| Salt spray test | 1008 h | | | | | | |
| Scribe creep | mm | 0 | 0.5 | 0.5 | 0.5 | 0.8 | 1–2 |
| Edge creep | mm | 3–4 | 1–3 | 1–3 | 2 | 2 | 1–2 |
| T-bend[3] | T0 | T0 | T0 | T0 | T0 | T0 | T0 |

[1]Chromate-free primer from BASF as comparison
[2]Crosslinking test: number of double strokes (DS) with a methyl ethyl ketone-soaked cotton pad until the film is destroyed
[3]Flexibility test in accordance with ECCA T7

The table shows that the scribe creep in accordance with the invention is ≦0.8 mm whereas in the case of the comparative example it is 1–2 mm.

Example of a Pigmented Coil Coating Primer 32.38 parts of the modified epoxy resin from Example 4, sub-example 5.a.

0.23 part of Aerosil 200 100%

4.16 parts of Finn talc M5 micro 16.96 parts of titanium rutile RR2 EI.Arm 4.32 parts of Shieldex CP4–7394

5.86 parts of Sicor ZNP/S 7.71 parts of Solvesso 150

7.71 parts of butyl glycol are premixed in a dissolver for 10 minutes and then ground in a sandmill to a fineness of 13–15 µm for 25 minutes. This stock coating paste is subsequently admixed with 9.25 parts of the modified epoxy resin from Example 4, sub-example 5.a.

10.49 parts of the crosslinker from Example 4, sub-example 5.b. and 0.93 parts of monobutyltin oxide solution and the mixture is thoroughly homogenized.

The resultant primer is applied using a coating bar (rod No. 10) to both hot-dip galvanized steel panels (Bonder 1303 from Chemetall) and galvanized steel plate (Granodine 108, chromated, from Henkel) and baked at a peak temperature of 216° C. under the above conditions.

Table of Results:

|  | Substrates: | |
| --- | --- | --- |
| Tests | Hot-dipped | Galvanized |
| Coat thickness [µm] | 5 | 5 |
| MEK test [DS] | >30 | >30 |
| Salt spray test 1008 h: | | |
| Scribe creep [mm] | <2 | 0.5 |
| Edge creep [mm] | <2 | 1 |
| T-bend | 035 | T0 |

What is claimed is:

1. A method of coil coating a substrate comprising
   cleaning the substrate surface,
   applying a primer, and
   applying a topcoat by a method selected from the group consisting of spraying, dipping, knifecoating, rollercoating and brushing,
      wherein the primer comprises an amine-modified epoxy resin and an oligomeric polyol and has a viscosity of from 50 to 150 seconds in a DIN4 cup.

2. The method of claim 1, wherein the amine-modified epoxy resin comprises the reaction product of
   A) one or more polyepoxides selected from the group consisting of modified polyepoxides, nonmodified polyepoxides, and mixtures thereof,
   B) one or more members selected from the group consisting of primary amines, secondary amines, the salts of primary amines, the salts of secondary amines, salts of tertiary amines and mixtures thereof, and
   optionally, C) one or more members selected from the group consisting of polyols, polycarboxylic acids, polyamines, polysulfides, and mixtures thereof.

3. The method of claim 1, wherein the primer is present in an organically or aqueously diluted form.

4. The method of claim 3, wherein the amine-modified epoxy resin comprises the reaction product of an epoxy resin which has been modified with one or more members selected from the group consisting of a monophenol compound, a thiol compound, amine, diols, dicarboxylic acids, and mixtures thereof.

5. A method according to claim 1, wherein the oligomeric polyol comprises a polyether alcohol.

6. A method according to claim 1, wherein the oligomeric polyol is selected from the group consisting of polypropylene glycol, polyethylene glycol, and polypropylene/polyethylene mixed diols.

7. A method according to claim 1, wherein the oligomeric polyol is selected from the group consisting of ethoxylated bisphenol A, propoxylated bisphenol A, ethoxylated/propoxylated bisphenol A, ethoxylated monophenols, propoxylated monophenols, ethoxylated/propoxylated monophenols, and mixtures thereof.

8. A method according to claim 1, wherein the oligomeric polyol comprises polycaprolactone.

9. A method according to claim 1, wherein the primer further comprises a crosslinking agent, and the primer comprises up to 30% by weight of the oligomeric polyol based on the total weight of the amine modified epoxy resin, the oligomeric polyol, and the crosslinker.

10. A coil-coated substrate comprising a substrate and one or more coats, the coil-coated substrate prepared by a coil-coating method comprising
    cleaning the substrate surface,
    applying a primer coat
    optionally applying a topcoat or a plurality of topcoats by a method selected from the group consisting of spraying, dipping, knifecoating, rollercoating and brushing, and
    baking the substrate,
       wherein the primer comprises an amine-modified epoxy resin and an oligomeric polyol and has a viscosity of from 50 to 150 seconds in a DIN4 cup.

11. The coated substrate of claim 10, wherein the amine-modified epoxy resin comprises the reaction product of
    A) one or more polyepoxides selected from the group consisting of modified polyepoxides, nonmodified polyepoxides, and mixtures thereof,
    B) one or more members selected from the group consisting of primary amines, secondary amines, the salts of primary amines, the salts of secondary amines, salts of tertiary amines and mixtures thereof, and
    optionally, C) one or more members selected from the group consisting of polyols, polycarboxylic acids, polyamines, polysulfides, and mixtures thereof.

12. The coated substrate of claim 10, wherein the primer comprises one or more amine-modified epoxy resins in an organically or aqueously diluted form.

13. The coated substrate of claim 12, wherein the amine-modified epoxy resin comprises the reaction product of an epoxy resin which has been modified with one or more members selected from the group consisting of a monophenol compound, a thiol compound, amine, diols, dicarboxylic acids, and mixtures thereof.

14. The coated substrate of claim 13, wherein component A comprises the result of reacting
    a) a diepoxide compound or a mixture of diepoxide compounds having an epoxide equivalent weight of less than 2000 with b) at least one phenolic hydroxyl- or thiol-containing compound that reacts monofunctionally with the epoxide groups under the given reaction conditions, wherein components (a) and (b) are employed in a molar ratio of from 10:1 to 1:1, and the reaction of component (a) with component (b) is conducted at a temperature of from 100 to 190° C.

15. A substrate according to claim 5, wherein the oligomeric polyol comprises a polyether alcohol.

16. A substrate according to claim 10, wherein the oligomeric polyol is selected from the group consisting of polypropylene glycol, polyethylene glycol, and polypropylene/polyethylene mixed diols.

17. A substrate according to claim 10, wherein the oligomeric polyol is selected from the group consisting of ethoxylated bisphenol A, propoxylated bisphenol A, ethoxylated/propoxylated bisphenol A, ethoxylated monophenols, propoxylated monophenols, ethoxylated/propoxylated monophenols, and mixtures thereof.

18. A substrate according to claim 10, wherein the oligomeric polyol comprises polycaprolactone.

19. A substrate according to claim 10, wherein the primer further comprises a crosslinking agent, and the primer comprises up to 30% by weight of the oligomeric polyol based on the total weight of the amine modified epoxy resin, the oligomeric polyol, and the crosslinker.

20. A method of producing an article, wherein the article is selected from the group consisting of construction accessories, furniture, instrument paneling, vehicle bodies, domestic appliances, and lamp casings, comprising the steps of providing a substrate, and coating the substrate with a process comprising the steps of cleaning the substrate surface, applying a primer, and applying a topcoat by a method selected from the group consisting of spraying, dipping, knifecoating, rollercoating and brushing, wherein the primer comprises an amine-modified epoxy resin and an oligomeric polyol and has a viscosity of from 50 to 150 seconds in a DIN4 cup.

* * * * *